No. 644,049. Patented Feb. 27, 1900.
D. BAKER.
WHEEL.
(Application filed June 23, 1899.)
(No Model.)

Witnesses:
F. S. Elmore.
A. M. E. Kennedy.

Inventor:
David Baker
By P. T. Dodge
Attorney

UNITED STATES PATENT OFFICE.

DAVID BAKER, OF CHICAGO, ILLINOIS.

WHEEL.

SPECIFICATION forming part of Letters Patent No. 644,049, dated February 27, 1900.

Application filed June 23, 1899. Serial No. 721,625. (No model.)

*To all whom it may concern:*

Be it known that I, DAVID BAKER, of Chicago, county of Cook, and State of Illinois, have invented a new and useful Improvement in Wheels, of which the following is a specification.

The object of this invention is to produce a strong, light, and durable wheel adapted more particularly as a barrow-wheel for use at blast-furnaces, where the wear is particularly severe; and my invention consists of the improved construction and arrangement of parts more fully described hereinafter.

Figure 1:
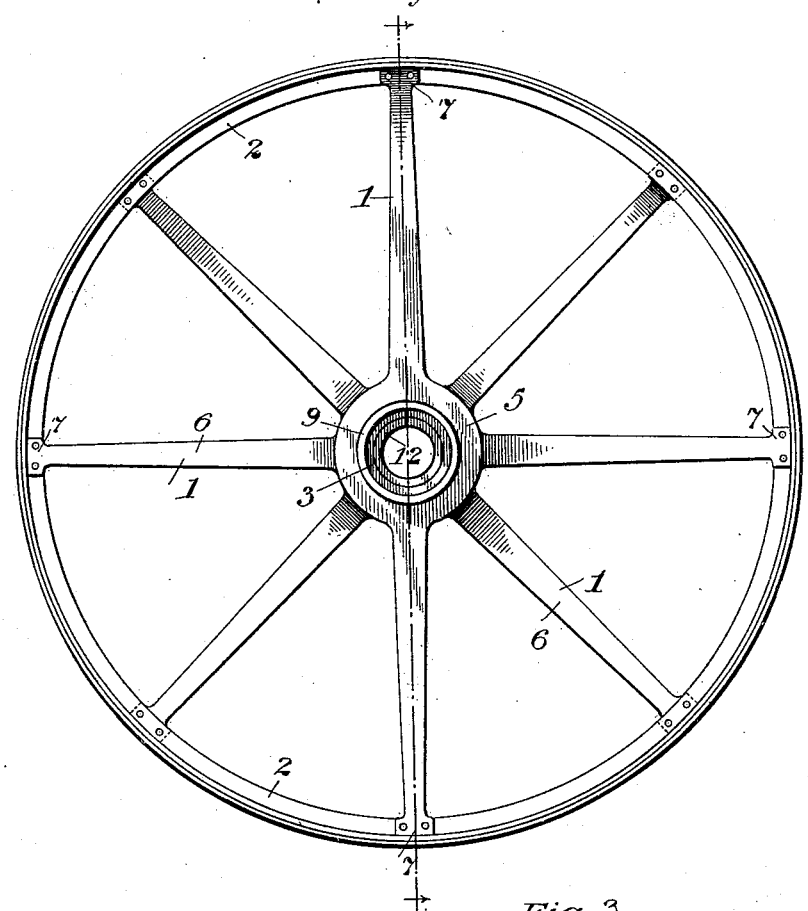
Figure 2:
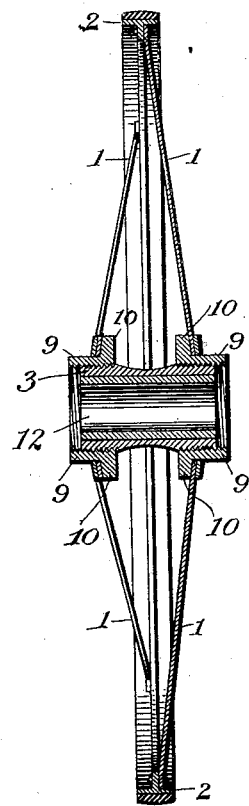
Figure 3:
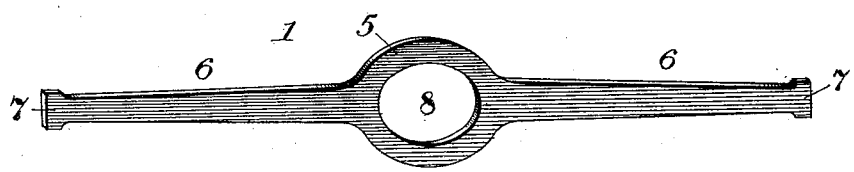
Figure 4:
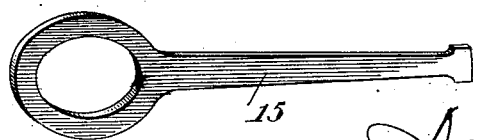

In the accompanying drawings, Figure 1 is a side elevation of my improved wheel in its preferred form. Fig. 2 is a central axial section through the same. Fig. 3 is a perspective view of one of the continuous spokes. Fig. 4 is a perspective view of a modified form of the spoke.

Referring to the drawings, my improved wheel comprises a series of spokes 1, which are preferably of sheet-steel, a rim 2, of commercial T-iron, a hub 3, of a pipe-section, and a metallic tire.

In the form of the wheel represented in Figs. 1, 2, and 3 the spokes are continuous—that is to say, they extend entirely across the wheel from diametrically-opposite points and constitute, in effect, two spokes, each extending from the hub to the rim. These continuous spokes are arranged in two series on opposite sides of the rim, as will be presently particularly described. They are formed from sheet-steel, with a flat circular enlarged central portion 5 and two oppositely-extending arms 6, widened at their ends, as at 7, to adapt them to be firmly secured to the web of the T-iron composing the rim. The central enlarged portion is provided with circular openings 8, which openings are adapted on the two sides of the wheel to loosely encircle the outer ends of two tension-adjusting sleeves 9, threaded interiorly and screwed on the threaded ends of the hub 3, which may be conveniently formed of a section of commercial pipe. The two adjusting-sleeves are provided at their inner adjacent ends each with an annular shoulder 10, against which the enlarged central portions of the inner spokes bear, as clearly shown in Fig. 2.

In the present instance I have shown the wheel as provided with eight spokes, formed by two continuous superposed spokes applied on each side of the wheel at right angles to each other, with the arms of the continuous spokes on one side of the wheel arranged midway between the arms of those on the opposite sides; but it is obvious that a greater or less number of spokes may be employed and that their arrangement may be modified as desired.

In assembling the parts of the wheel the two tension-adjusting sleeves are first screwed inward toward the center of the hub, which latter has its central portion reduced in diameter to permit the sleeves to be brought close together. The spokes are then passed over the ends of the sleeves, the inner spokes bearing against the shoulder 10 and the outer spokes bearing on the enlarged portion of the inner ones. The outer widened ends of the spokes are riveted or otherwise firmly secured to the opposite faces of the web of the T-iron of the rim on which the tire has been previously shrunken and suitably secured. The tension-adjusting sleeves are now screwed outward in opposite directions, the effect of which will be to separate the central portions of the two series of spokes and place them under tension, the strain on the rim being exerted equably by each spoke at diametrically-opposite points. The tension-adjusting sleeves are of such length that when screwed outward sufficiently to give the desired tension to the spokes their ends will extend a slight distance beyond the ends of the hub, thus forming dust-guards, serving to effectually prevent the entrance of dust or other foreign substances to the interior of the hub.

I propose to apply within the hub a bushing 12 in the form of a sleeve, preferably of brass, which may be removed and replaced by a new one when worn.

In Fig. 4 the spokes are not continuous in one piece, but are each made up of two members 15, consisting of a strip of sheet-steel having one end enlarged and provided with an opening to encircle the tension-adjusting sleeves and its outer end widened to be secured to the rim. In assembling the parts when of this form it is preferable that the two members be arranged end to end and in line, so that when tension is applied by the sleeves the strain will be exerted on the rim at diametrically-opposite points; but it is obvious that the two members of the spoke may be arranged at an angle, the essence of the invention in this respect residing in the spoke made from sheet metal, with an opening to encircle the adjusting-sleeve and with an end adapted to be secured to the rim.

From the above description it will be observed that I produce a wheel wholly of metal and of a form to withstand severe and rough usage. It is further seen that certain parts of the wheel, such as the box or bushing and the tire where the greatest wear comes, are removable, and, further, by reason of the peculiar form and arrangement of the spokes they may be placed under a high degree of tension without the liability of fracture, the enlarged central portions forming a strong and extended bearing for the sleeves.

Having thus described my invention, what I claim is—

1. The improved wheel comprising in combination, a hub, a rim, continuous superposed sheet-metal spokes on each side of the wheel provided midway between their ends each with an opening to receive the hub and secured each to the rim at diametrically-opposite points, and tension-sleeves adjustable longitudinally of the hub and adapted to engage the inner spokes only, adjacent to their openings.

2. The improved wheel comprising in combination, a hub, a rim, continuous sheet-metal spokes provided midway between their ends each with an enlarged portion containing an opening and secured at their ends to the rim at diametrically-opposite points, and adjustable tension-sleeves mounted on the hub and extending within the openings in the spokes and provided each with an annular shoulder to form a support for the spokes.

3. The improved wheel comprising in combination, a hub, two series of continuous sheet-metal spokes arranged respectively on opposite sides of the wheel with the spokes on one side arranged midway between those on the opposite side, and each spoke provided midway between its ends with an opening, and adjustable tension-sleeves mounted on the hub and extending within the openings in the spokes.

4. The improved continuous spoke consisting of a sheet-metal strip provided midway between its ends with an opening to receive an adjusting-sleeve on the hub, and formed at its ends to be secured to the rim of the wheel at diametrically-opposite points.

In testimony whereof I hereunto set my hand, this 6th day of June, 1899, in the presence of two attesting witnesses.

DAVID BAKER.

Witnesses:
W. J. MELONE,
H. E. N. STINE.